No. 704,516. Patented July 15, 1902.
J. L. CLARK.
STALK RAKE.
(Application filed June 5, 1901.)
(No Model.) 2 Sheets—Sheet 1.

No. 704,516. Patented July 15, 1902.
J. L. CLARK.
STALK RAKE.
(Application filed June 5, 1901.)
(No Model.) 2 Sheets—Sheet 2.

Witnesses
C. S. Frye
M. Arthur Budd

Inventor:
J. L. Clark,
By W. T. Fitzgerald & Co.
Attorneys.

UNITED STATES PATENT OFFICE.

JOSEPH LAUSON CLARK, OF LEBANON, TEXAS.

STALK-RAKE.

SPECIFICATION forming part of Letters Patent No. 704,516, dated July 15, 1902.

Application filed June 5, 1901. Serial No. 63,205. (No model.)

*To all whom it may concern:*

Be it known that I, JOSEPH LAUSON CLARK, a citizen of the United States, residing at Lebanon, in the county of Collin and State of Texas, have invented certain new and useful Improvements in Stalk-Rakes; and I do hereby declare the following to be a full, clear, and exact description of the invention, such as will enable others skilled in the art to which it appertains to make and use the same.
My invention relates to rakes, which while desirable and useful for meeting the requirements of any and all situations is especially applicable as a rake for gathering corn or cotton stalks from the ground preparatory to plowing the same or otherwise fitting it for use.

My improved rake will be also desirable as a hay-rake and for other purposes, as will be readily understood from the following specification.

The object of my invention is to provide a simple, cheap, and reliably efficient construction and combination of parts which will sub-serve the purposes above set forth.

The details of construction and combination of parts will be illustrated in the accompanying drawings, in which—

Figure 1:
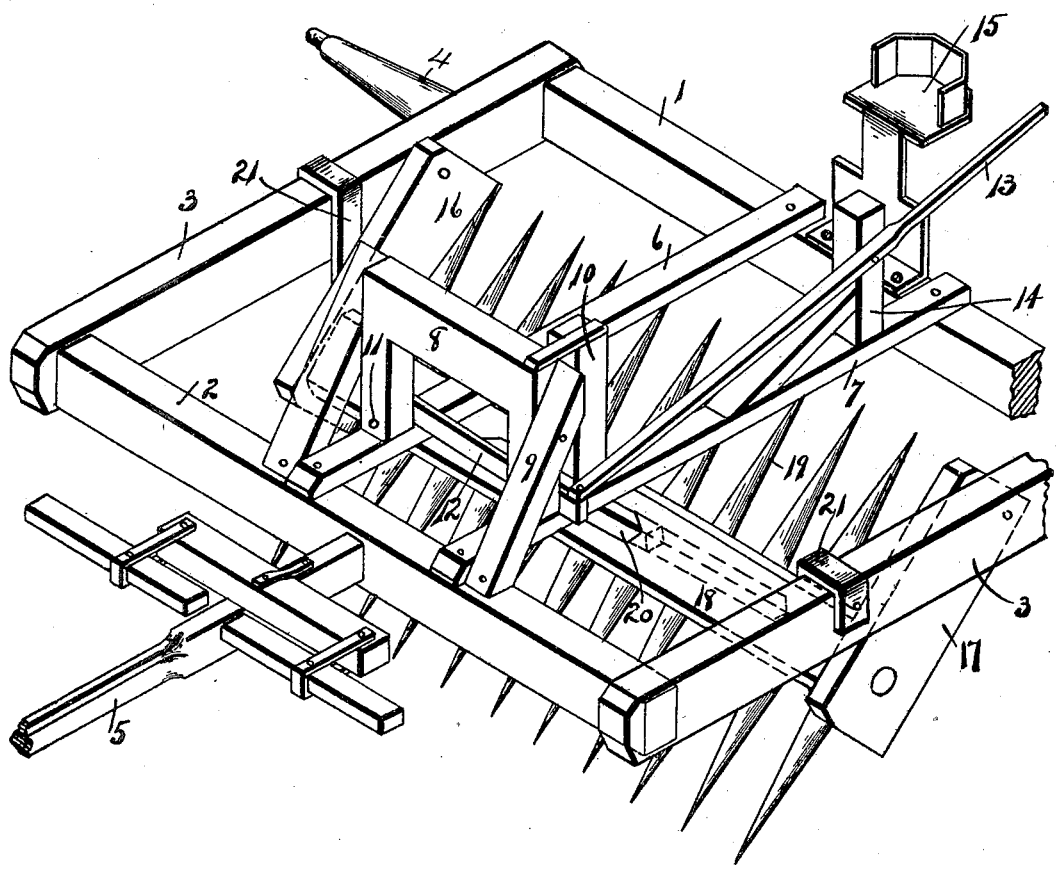
Figure 3:
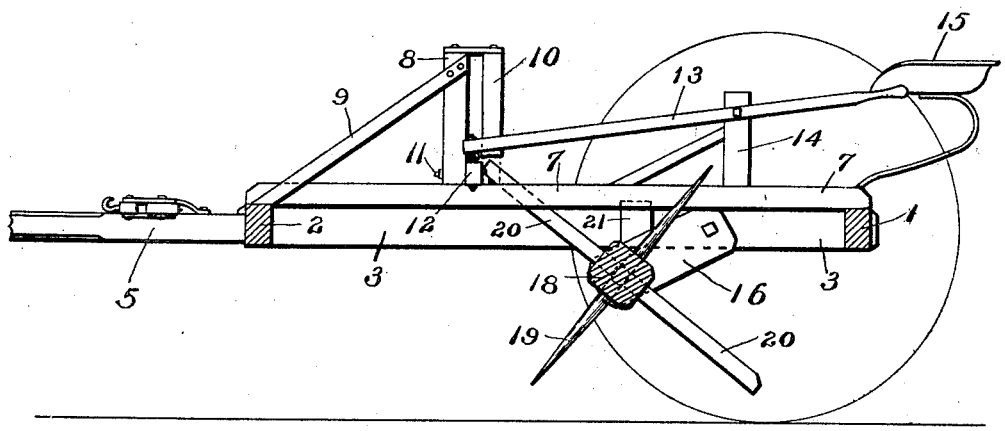
Figure 2:
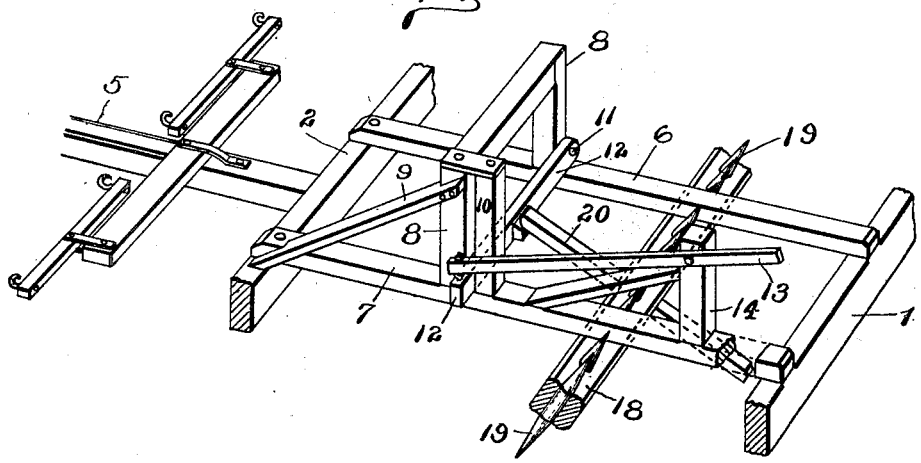

Figure 1 is a perspective view showing the body portion of my improved rake with the carrying-wheels removed. Fig. 2 is a perspective detail with parts in section. Fig. 3 is a substantially central longitudinal vertical section through Fig. 1.

In order to conveniently refer to the several features of my invention and their coöperating accessories, numerals will be employed, of which 1 and 2 indicate, respectively, the rear and front portions of the frame, the end portions being designated by the numeral 3, said parts being permanently united together in any preferred way.

Suitable carrying-wheels are operatively connected with the journals 4 in order that the frame may be held a proper height from the ground, while a tongue 5 may be secured to the frame-section 2 in any preferred way whereby the rake may be drawn over the ground as desired.

The sections 1 and 2 are connected with each other by and adapted to support the frame-sections 6 and 7, said frame-sections being designed to afford a support for the bracket 8, which latter is properly braced and sustained in its operative position, as by the member 9. A post 10 is also secured to the section 7, so as to stand near to and parallel with the bracket 8, while pivotally connected to the opposite side of the bracket, as indicated by the bolt 11, is the controlling-bar 12, the free end of which extends between the bracket 8 and the post 10 and is adapted to be moved freely between said parts, as by means of the operating-lever 13, which latter is pivotally connected to the post 14, also erected upon the section 7 near the seat 15, whereby the operator may readily grasp the lever and readily control the same.

Pivotally connected, preferably, to the inner sides of the sections 3 are the brackets 16 and 17, and in the lower free ends thereof I journal the ends of the rake-shaft 18, whereby said shaft is free to revolve. The shaft 18 is provided with a series of rake-teeth 19, which are preferably so formed that they will extend entirely through the shaft, and thereby form teeth upon both sides thereof. The teeth 19 are disposed parallel or in line with each other from end to end of the shaft 18, while extending through the shaft 18 at right angles to the disposition of the teeth is the locking member 20. Said locking member 20 is of sufficient length to extend an equal distance upon each side of the shaft 18, said member being slightly longer than the teeth. The extreme ends of the member 20 are each designed to contact with the controlling-bar 12 when the latter is disposed downward, thereby insuring that the shaft 18 will be locked against rotation when the end of the member 20 is in engagement with said bar, as is obvious.

In order to limit the downward movement of the brackets 17 and 16, I connect the free ends thereof with the sections 3, preferably by means of the flexible strap or member 21, and since said strap is flexible in character the free ends of the brackets are left to move freely upward, as desired, in order to compensate for any uneven portions of the surface of the ground.

The downward movement of the free ends of the brackets 16 and 17 is limited, as above set forth, by the member 21, so that when the controlling-bar 12 is down it will obstruct the downward movement of the free end of the locking member 20, thereby holding the shaft 18 against rotation and insuring that the lower ends of the series of teeth will come closely in contact with the surface of the ground, and thus insure a load of stalks or the like, and it is obvious that when the teeth of the rake have become loaded such load may be discharged by permitting the shaft 18 to partially rotate, which may be readily accomplished by pressing downward upon the lever 13 and incidentally raising the free end of the controlling-bar 12, so that it will lie out of the path of the downward movement of the locking member 20. When the bar 12 is thus raised, the result will be that the points of the teeth will drop into engagement with the surface of the ground and the shaft 18 will be rotated until the opposite end of the locking member 20 shall have engaged the bar 12, which in the meantime has been dropped downward upon the section 7, thereby insuring that the opposite ends of the teeth will be brought near the surface of the ground, and thus disposed in their operative positions ready to gather another load, the operation being repeated throughout the travel across the field.

By the arrangement thus described the load of stalks may be dropped at regular intervals, thereby making it possible to dispose the stalks or hay in regularly-located rows, as is common.

My improved rake may be made any preferred size or of any suitable material deemed best adapted for the purpose, and while I have described the preferred construction and combination of parts deemed necessary in materializing my invention it will be understood that I desire to comprehend in this application all substantial equivalents and substitutes.

Having thus fully described the construction and manner of using my improved rake, further reference to the drawings is deemed unnecessary.

What I claim as new, and desire to secure by Letters Patent, is—

In a rake of the character described, a frame, frame-sections 6 and 7 thereon, a bracket 8 on said frame-sections, a post 10 on one of said sections parallel with said bracket, a controlling-bar pivoted at one end to said bracket with its free end extended between the bracket and post, an operating-lever pivoted to the free end of said bar and to a support in proximity to the seat, brackets 16 and 17 pivotally mounted on opposite sides of the frame, a rake-shaft journaled in the lower ends of said brackets, teeth on said shaft, a locking member passed through the shaft at right angles to its length and extended upon both sides of said shaft, with one end adapted to engage said controlling-bar, and flexible members 21 depending from opposite sides of the frame with their upper ends embracing three sides of the side pieces of the frame and their lower ends connected to the lower ends of said brackets to limit the downward movement of the brackets 16 and 17, as set forth.

In testimony whereof I affix my signature in presence of two witnesses.

JOSEPH LAUSON CLARK.

Witnesses:
T. J. CAMPBELL,
T. P. GORDEN.